United States Patent
Jin

(10) Patent No.: US 9,793,584 B2
(45) Date of Patent: Oct. 17, 2017

(54) BATTERY MODULE

(75) Inventor: Hee-Joon Jin, Yongin-si (KR)

(73) Assignees: SAMSUNG SDI CO., LTD., Yongin-Si, Gyeonggi-Do (KR); ROBERT BOSCH GmbH, Stuttgart (DE)

(*) Notice: Subject to any disclaimer, the term of this patent is extended or adjusted under 35 U.S.C. 154(b) by 1097 days.

(21) Appl. No.: 13/337,729

(22) Filed: Dec. 27, 2011

(65) Prior Publication Data

US 2012/0315519 A1 Dec. 13, 2012

Related U.S. Application Data

(60) Provisional application No. 61/495,660, filed on Jun. 10, 2011.

(51) Int. Cl.
| | | |
|---|---|---|
| *H01M 10/613* | (2014.01) | |
| *H01M 10/625* | (2014.01) | |
| *H01M 10/6555* | (2014.01) | |
| *H01M 10/647* | (2014.01) | |

(52) U.S. Cl.
CPC ....... *H01M 10/613* (2015.04); *H01M 10/625* (2015.04); *H01M 10/6555* (2015.04); *H01M 10/647* (2015.04)

(58) Field of Classification Search
CPC .................. H01M 2/1061; H01M 10/6555
See application file for complete search history.

(56) References Cited

U.S. PATENT DOCUMENTS

| | | | | |
|---|---|---|---|---|
| 5,480,743 A | * | 1/1996 | McCarter | H01M 6/34 429/100 |
| 5,756,227 A | | 5/1998 | Suzuki et al. | |
| 2006/0049799 A1 | | 3/2006 | Hamada et al. | |
| 2007/0037051 A1 | * | 2/2007 | Kim | H01M 2/1016 429/151 |
| 2008/0160395 A1 | * | 7/2008 | Okada | B60L 3/0046 429/99 |
| 2009/0253026 A1 | | 10/2009 | Gaben | |
| 2011/0052959 A1 | * | 3/2011 | Koetting | H01M 10/653 429/120 |

(Continued)

FOREIGN PATENT DOCUMENTS

| | | |
|---|---|---|
| CN | 101212032 A | 7/2008 |
| CN | 201758165 U | 3/2011 |

(Continued)

OTHER PUBLICATIONS

EP Office Action Dated Sep. 4, 2012.

(Continued)

*Primary Examiner* — Alix Eggerding
(74) *Attorney, Agent, or Firm* — Lee & Morse, P.C.

(57) ABSTRACT

A battery module includes a plurality of battery cells and a plurality of cell barriers. Each cell barrier is between adjacent battery cells of the plurality of battery cells and includes at least one flange. The flange has a first flange portion and a second flange portion. The first flange portion has a first sealing edge extending therefrom and overlapping a first lateral side of one of the adjacent battery cells, and the second flange portion has a second sealing edge extending therefrom and overlapping a second lateral side of another of the adjacent battery cells.

11 Claims, 5 Drawing Sheets

(56) References Cited

U.S. PATENT DOCUMENTS

| | | | |
|---|---|---|---|
| 2011/0135985 A1* | 6/2011 | Kim | H01M 10/02 |
| | | | 429/120 |
| 2011/0223462 A1 | 9/2011 | Kim et al. | |
| 2015/0171456 A1 | 6/2015 | Uehara et al. | |

FOREIGN PATENT DOCUMENTS

| | | | | |
|---|---|---|---|---|
| JP | 2007-280858 A | | 10/2007 | |
| JP | 2007280858 | * | 10/2007 | H01M 2/10 |
| JP | 2009-252746 A | | 10/2009 | |
| JP | 2009-277471 A | | 11/2009 | |
| JP | 2010-108733 A | | 5/2010 | |
| JP | 2010 123377 A | | 6/2010 | |
| JP | 2011-034775 A | | 2/2011 | |
| KR | 10-2007-0018507 | | 2/2007 | |
| KR | 10-2007-0025735 A | | 3/2007 | |

OTHER PUBLICATIONS

Office Action mailed Jul. 3, 2015 in corresponding Chinese Patent Application No. 201210055375.9.
Japanese Office Action dated Apr. 19, 2016 in Corresponding Japanese Patent Application No. 2012-130683.
European Examination Report dated Nov. 24, 2016 in corresponding European Patent Application No. 12 162 301.1, JIN.
Chinese Office Action mailed Feb. 14, 2016 in corresponding Chinese Patent Application No. 201210055375.9; JIN.
Korea Office Action mailed Feb. 19, 2016 in corresponding Korean Patent Application No. 10-2012-0058367; JIM.
Chinese Decision of Rejection dated Aug. 11, 2016 in Corresponding Chinese Patent Application No. 201210055375.9.

\* cited by examiner

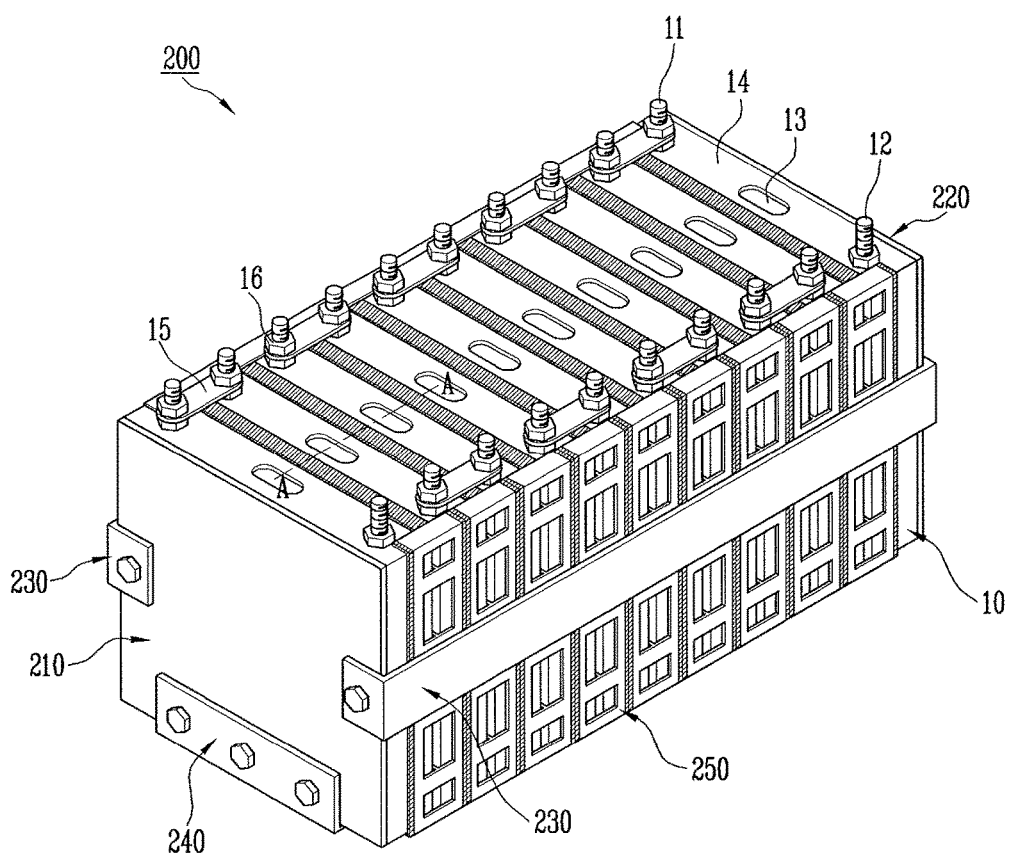

BATTERY MODULE

CROSS-REFERENCE TO RELATED APPLICATION

The present application claims priority under 35 U.S.C. §119(e) to U.S. Provisional Application No. 61/495,660, filed on Jun. 10, 2011, and entitled "Battery Module," which is incorporated herein by reference in its entirety.

BACKGROUND

A high-output battery module using, e.g., non-aqueous electrolyte solution having high-energy density, has been developed. The high-output battery module may include a plurality of battery cells connected to each other in series to form a large-capacity battery module. The large-capacity battery module may be used to drive high-power equipment, e.g., a motor of an electric vehicle and the like.

SUMMARY

Embodiments may be realized by providing a plurality of battery cells and a plurality of cell barriers. Each cell barrier is between adjacent battery cells of the plurality of battery cells and includes at least one flange, and the flange has a first flange portion and a second flange portion. The first flange portion has a first sealing edge extending therefrom and overlaps a first lateral side of one of the adjacent battery cells, and the second flange portion has a second sealing edge extending therefrom and overlaps a second lateral side of another of the adjacent battery cells.

The first sealing edge and the second sealing edge of adjoining cell barriers may sealingly define flow passageways between the adjacent battery cells. The first sealing edge may sealingly contact the second sealing edge. The first sealing edge and second sealing edge may include an elastic member.

The flange may overlap first and second lateral sides of the adjacent battery cells, and the at least one cell barrier may include another flange overlapping third lateral sides of the adjacent battery cells. The first lateral sides and the second lateral sides may oppose the third lateral sides, respectively. The one flange and the other flange may include flow openings for the flow of heat exchange medium therethrough.

The at least one cell barrier may include a lower flange overlapping fourth lateral sides of the adjacent battery cells, and an upper part adjacent to fifth lateral sides of the adjacent battery cells. The fourth lateral sides may oppose the fifth lateral sides. The upper part may be an elastic member that connects the one flange and the other flange.

The first and second sealing edges may have a tapered shape. The cell barriers may define passageways along the battery cells for the flow of heat exchange medium between flow openings in the flanges.

Embodiments may also be realized by providing a battery module including a plurality of battery cells and at least one cell barrier. The cell barrier includes a base part between adjacent battery cells of the plurality of battery cells and at least one flange. The flange extends from the base part and overlaps lateral sides of the adjacent battery cells. The flange includes a flange portion and an edge portion extending from the flange portion, the flange portion includes a first material, and the edge portion includes a second material, the second material being different from the first material.

The second material of the edge portion may be an elastic material. The first material may include at least one of a stainless steel, aluminum, and a plastic, and the second material may include a rubber. The flange portion and the base part may include the first material.

The one flange may include the edge portion extending therefrom and may overlap first lateral sides of the adjacent battery cells. The at least one cell barrier may include another flange opposite the one flange. The other flange may include another edge portion extending therefrom and may overlap second lateral sides of the adjacent battery cells, the edge portions of the one flange and the other flange may include the second material, and the second material may be an elastic material.

The at least one cell barrier may include a lower flange overlapping third lateral sides of the adjacent battery cells, and an upper part adjacent to fourth lateral sides of the adjacent battery cells. The third lateral sides may oppose the fourth lateral sides.

The at least one flange may be substantially perpendicular to a lateral side of the base part. The edge portion may be an elastic material on substantially an entire lateral side of the flange portion. The edge portion may be a doubly injected elastic material on the flange portion.

The at least one cell barrier may include a first cell barrier and a second cell barrier. The first cell barrier may include a first edge portion that contacts a second edge portion of the second cell barrier.

Embodiments may also be realized by providing a battery module that includes a plurality of battery cells arranged in one direction, barriers interposed between the plurality of battery cells, housings accommodating the battery cells and the barriers. The barrier includes a base part disposed in parallel to the battery cell and flange parts contacting the battery cell in at least any one of upper and lower portions or both sides of the base part and the barrier is made of a first material, and at least a part of the flange parts is made of a second material different from the first material.

BRIEF DESCRIPTION OF THE DRAWINGS

Features will become apparent to those of ordinary skill in the art by describing in detail exemplary embodiments with reference to the attached drawings, in which:

FIG. 3 illustrates a perspective view of a battery module including a plurality of battery cells, according to an exemplary embodiment.

DETAILED DESCRIPTION

Figure 1:
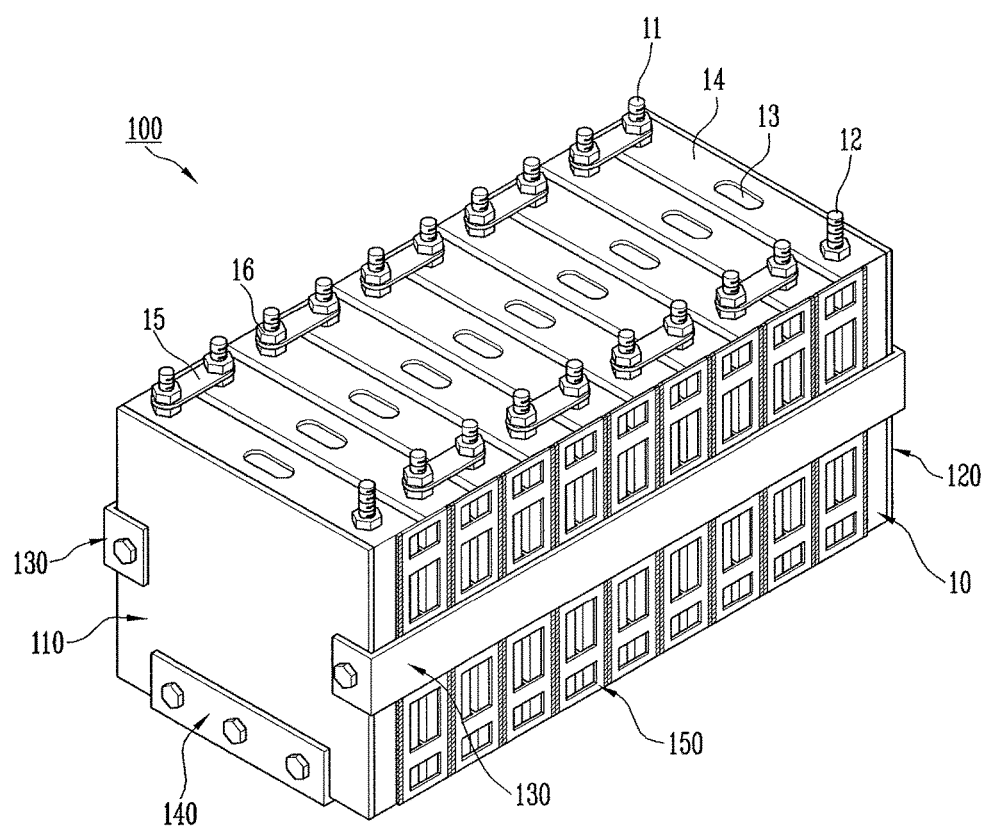
FIG. 1 illustrates a perspective view of a battery module including a plurality of battery cells, according to an exemplary embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art. Characteristics of the embodiments and methods for achieving them will be apparent with reference to the exemplary embodiments described below in detail in addition to the accompanying drawings.

In the drawing figures, the dimensions of layers and regions may be exaggerated for clarity of illustration. It will also be understood that when an element is referred to as being "on" another element, it can be directly on the other element, or intervening elements may also be present. Further, it will be understood that when an element is referred to as being "between" two elements, it can be the only element between the two elements, or one or more intervening elements may also be present. It will further be understood that when an element is referred to as being "coupled" to another element, the element may be "directly coupled" to the other element or one or more intervening elements may also be present.

Like reference numerals refer to like elements throughout. In order to elucidate the embodiments, parts that are not related to the description will be omitted.

Figure 2A:
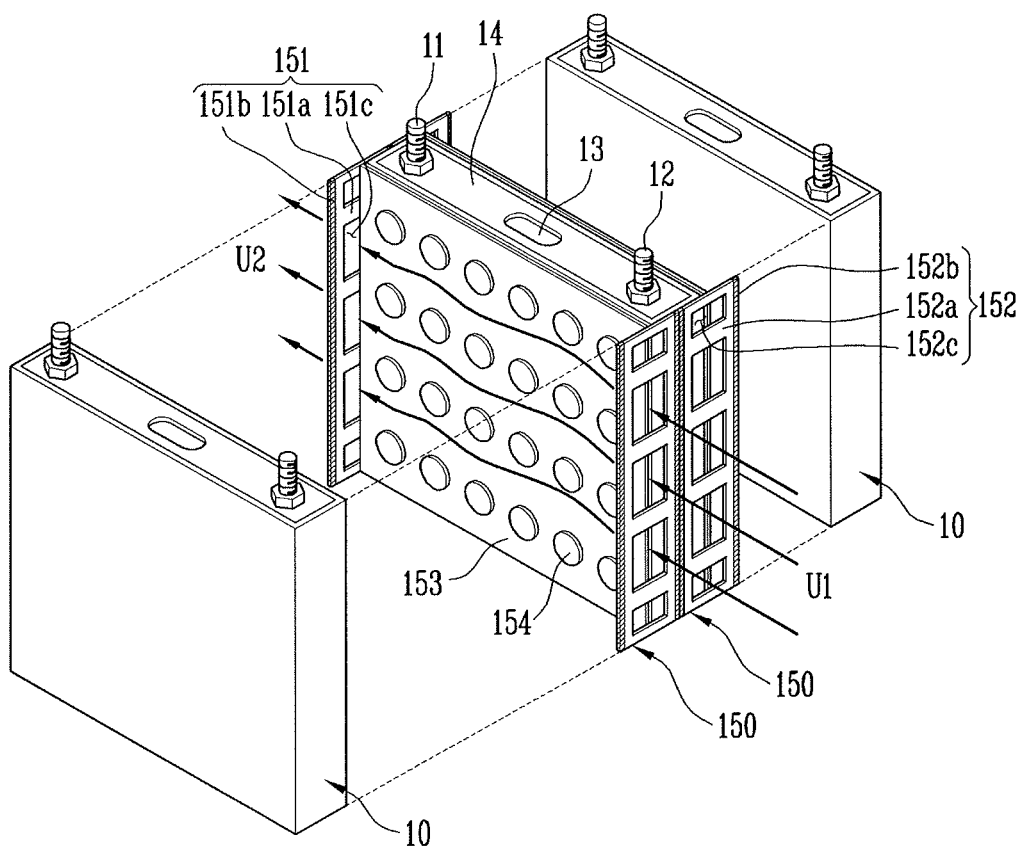
FIG. 2A illustrates a perspective view of a barrier interposed between battery cells, according to an exemplary embodiment.
Figure 2B:
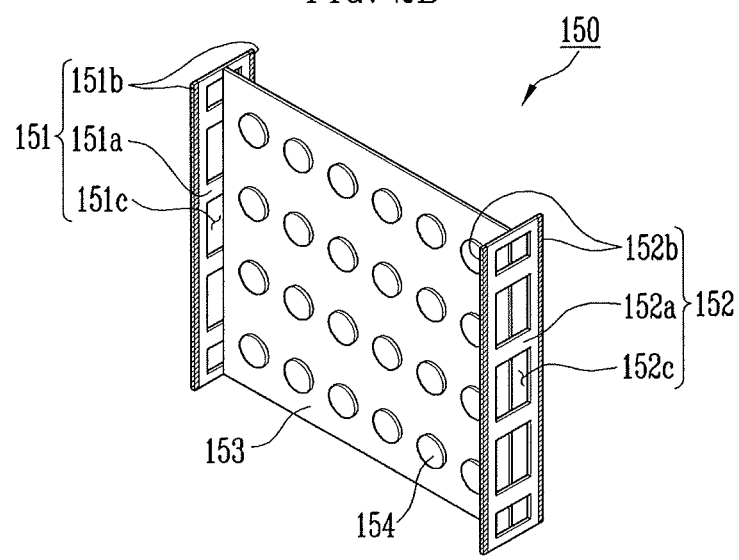
FIG. 2B illustrates a perspective view of a barrier, according to an exemplary embodiment.

FIG. 1 illustrates a perspective view of a battery module including a plurality of battery cells, according to an exemplary embodiment. FIG. 2A illustrates a perspective view of a barrier interposed between battery cells, according to an exemplary embodiment. FIG. 2B illustrates a perspective view of a barrier, according to an exemplary embodiment.

Referring to FIG. 1, a battery module 100 may include a plurality of battery cells 10 arranged adjacent to each other along a first direction. The battery module 100 may include a plurality of barriers 150, and the barriers 150 may be interposed between adjacent battery cells 10. According to an exemplary embodiment, the battery cells 10 and the barriers 150 may be alternately arranged in the first direction, e.g., each barrier 150 may be interposed between two adjacent battery cells 10. The barriers may be battery cell barriers so that the battery cells 10 may be seated in the barriers 150. Each battery cell 10 may be partially seated in two adjacent barriers 150, e.g., approximately one half of each battery cell 10 may be seated in one barrier 150. The battery module 100 may include housings 110, 120, 130, and 140 to, e.g., accommodate the battery cells 10 and the barriers 150 in the battery module 100. For example, the housings 110, 120, 130, and 140 may fix the arrangement of the battery cells 10 and the barriers 150.

The barrier 150 may include, e.g., a base part 153 disposed in a direction parallel to the battery cells 10, e.g., disposed in a second direction that is perpendicular to the first direction. The barrier 150 may include a plurality of flange parts, e.g., a flange part 151 and a flange part 152, which may be adjacent to and/or in contact with lateral sides of the battery cells 10. The flange part 151 may overlap a first lateral side of one battery cell 10 and flange part 152 may overlap a second lateral side of an adjacent battery cell 10. The barrier 150 may be made of a first material, and at least a part of the flange parts 151 and 152 may be made of a second material different from the first material.

The battery cell 10 may be manufactured by, e.g., inserting an electrode assembly and an electrolyte into a battery case and by sealing the battery case with a cap assembly 14 thereafter. The cap assembly 14 may include a positive terminal 11 and a negative terminal 12. The positive terminal 11 and the negative terminal 12 may be, e.g., disposed at opposing ends of the cap assembly 14. A vent 13 may be disposed between the positive terminal 11 and the negative terminal 12 in the cap assembly 14. The electrode assembly in the battery case may be connected with the positive terminal 11 and the negative terminal 12. The positive and the negative terminals 11 and 12 may act as a moving passage of energy generated by an electrochemical reaction between the electrode assembly and the electrolyte. The vent 13 may act as a passage for discharging gas generated in the battery cell 10 to an outside of the battery cell 10.

The housings 110, 120, 130, and 140 may bundle together the plurality of battery cells 10 and the barriers 150 interposed between the battery cells 10. Housings 110 and 120 may correspond to a pair of first and second end plates 110 and 120, respectively. The first and second end plates 110 and 120 may be disposed at opposing ends of the battery module 100, e.g., at the outside of the plurality of battery cells 10. The first and second end plates 110 and 120 may form opposing lateral ends of the battery module 100.

Housings 130 and 140 may correspond to connection members 130 and 140, respectively. The connection members 130 and 140 may connect the first and second end plates 110 and 120 to each other. The housings and connection members 130 and 140 may also correspond to a pair of side plates 130 of the battery cell 10 and a bottom plate 140 of the battery cell 10. The pair of side plates 130 may support both sides of the battery cells 10. The bottom plate 140 may support the bottom of the battery cells 10. One lateral end of each of the pair of side plates 130 and one lateral end of the bottom plate 140 may be connected to, e.g., fastened, to the first end plate 110. The opposing lateral ends of each of the pair of side plates 130 and the opposing lateral end of the bottom plate 140 may be connected to, e.g., fastened to, the second end plate 120. Thereby, the pair of side plates 130 and the bottom plate 140 may connect the first and the second end plates 110 and 120 to each other. The fastening of the pair of side plates 130 and the bottom plate 140 may be performed by using, e.g., a bolt-nut or the like. However, embodiments are not limited thereto.

The first and second end plates 110 and 120 and the connection members 130 and 140 may partition, e.g., provide, a predetermined space in order to accommodate the plurality of the battery cells 10 and the barriers 150 therebetween. For example, the plurality of the battery cells 10 and the barriers 150 may be arranged in the first direction in the partitioned space providing by the first and second end plates 110 and 120 and the connection members 130 and 140. The battery cells 10 may be arranged in parallel to each, e.g., so that widest surfaces of battery cells 10 face widest faces of adjacent battery cells 10.

The first and the second end plates 110 and 120, the pair of the side plates 130, and the bottom plate 140 may act to fix, e.g., stably fix, the plurality of battery cells 10 and the barriers 150 together to form the battery module 100, according to an exemplary embodiment. However, embodiments are not limited to the form of the exemplary embodiment and may be variously modified. For example, a connection structure of the battery cells 10 and the number of the battery cells 10 may be variously modified according to a design of the battery module 100.

The positive terminals 11 and/or the negative terminals 12 of two adjacent battery cells 10 may be electrically connected to each other through a bus-bar 15. The bus-bars 15 may include through-holes in which the positive terminal 11 and the negative terminal 12 may be extended therethrough. The bus-bar 15 in which the positive terminal 11 and the negative terminal 12 are connected by passing through the hole may be fixed, e.g., with nuts 16 and/or the like. The bus-bar 15 may be spaced apart from the flange parts 151 and 152 of the adjacent cell barriers 150.

Referring to FIGS. 2A and 2B, the base part 153 of the barrier 150 may be disposed to be parallel to the battery cells 10. According to an exemplary embodiment, the base part 153 may be interpreted between two adjacent battery cells 10, e.g., the base part 153 may be substantially entirely disposed between two adjacent battery cells 10. The flange parts 151 and 152 may coupled with, e.g., directly coupled with, the base part 153. The base part 153 may be connected to a center of the flange parts 151 and 152. The flange parts 151 and 152 may be coupled with opposing lateral sides of the base part 153 so that the flange part 151 is parallel to the flange part 152. The flange parts 151 and 152 may be adjacent to and/or contact both of the two adjacent battery cells. The two adjacent battery cells may be disposed at opposing sides of the base part 153. The flange parts 151 and 152 and the base part 153 may be arranged so that the two adjacent battery cells are seated in the barrier 150.

The base part 153 of the barrier 150 may be of a first material, and at least a part of the flange parts 151 and 152 may be made of a second material different from the first material. For example, the flange parts 151 and 152 may each include flange portions, e.g., elastic members, extending therefrom that are made of the second material. The flange portions may extend from portions of the flange parts 151 and 152 that are made of the first material. According to an exemplary embodiment, edges of the flange parts 151 and 152 may extend from portions made of the first material and may be made of the second material. The first material may include at least one of a metal, a stainless steel, aluminum, a plastic, and the like. The second material may include an elastic material, and the elastic member may include at least one of a rubber or the like.

The base part 153 may have a size that substantially corresponds to the wide surfaces, e.g., front and rear surfaces, of the battery cells 10. For example, a perimeter of the base part 153 may substantially correspond to, e.g., be substantially equal to, a perimeter of the widest surfaces of the adjacent battery cells 10.

A plurality of projections 154 may be disposed on the base part 153. The plurality of projections 154 may be protrusions spaced apart on the base part 153. The plurality of projections 154 may have various shapes that include, e.g., but are not limited to, cylindrical shapes. The plurality of projections 154 may contact the adjacent battery cells 10, e.g., the projections may contact the widest surfaces of the adjacent battery cells 10. The base part 153 may be interposed between the adjacent battery cells 10. The base part 153 may be spaced apart from the adjacent battery cells 10 at a predetermined interval by the projections 154. The projections 154 may act as a movement passage, e.g., may define flow passageways, of a heat exchange medium. For example, the flow of heat exchange medium to the adjacent battery cells 10 may be controlled and/or defined by the projections 154.

The flange parts 151 and 152 may be adjacent to and/or contact the sides of both the adjacent battery cells 10. The flange parts 151 and 152 may intersect, e.g., be substantially perpendicular, to the base part 153. Edges of the flange parts 151 and 152 may have a triangular pyramid shape of cross-section which is, e.g., gradually tapered toward a lateral end thereof. Ends of the flange parts 151 and 152 may be formed so as to be inclined toward sides of the adjacent battery cells 10. For example, the triangular pyramid shape of the edges of the flange parts 151 and 152 may include ends thereof, e.g., tapered ends, which face the sides of adjacent battery cells 10. According to an exemplary embodiment, the tapered ends may be tapered toward the sides of the adjacent battery cells 10.

The base part 153 may be connected to centers of the flange parts 151 and 152. For example, at least one of the flange parts 151 and 152 may include a flat plate portion, e.g., a tetragonal flat plate. The flat plate portion of at least one of the flange parts 151 and 152 may face sides of the adjacent battery cells 10. The base part 153 may be connected to centers of the flat plate portions of the flange parts 151 and 152. The flat plate portions of the flange parts 151 and 152 may be made of at least one of a metal, of a stainless steel, aluminum, a plastic, and the like.

The barriers 150 according to the exemplary embodiment may be provided so that the flange parts 151 and 152 of the adjacent barriers 150 are in close contact with each other, e.g., are in direct contact with each other. For example, a first side of one of the battery cells 10 may be seated in a first barrier 150 and a second side opposing the first side of the one of the battery cells 10 may be seated in a second barrier 150. Ends of the first and second barriers 150, e.g., tapered ends, may be in close contact with each other. The flange parts 151 and 152 of both the first and second barriers 150 may be made of the first material and the tapered ends on both the first and second barriers 150 may be made of the second material. The first and second barriers 150 may be provided so that the edges portions made of the second material on both the first and second barriers 150 contact each other, e.g., so that one tapered end of the first barrier 150 contacts one tapered end of the second barrier 150.

The flange parts 151 and 152 may include first portions 151a and 152a and second portions 151b and 152b, respectively. The first portions 151a and 152a may be a part of the flat plate portions of the flange parts 151 and 152, respectively. The first portions 151a and 152a may be disposed along opposing lateral sides of the base part 153. The first portions 151a and 152a may extend along substantially entire sides of the base part 153 or a portion of the sides of the base part 153. Opposing ends of the base part 153 may be connected, e.g., directly connected, to centers of the first portions 151a and 152a, respectively. The first portions 151a and 152a may be made of the first material, e.g., at least one of a metal, of a stainless steel, aluminum, a plastic, and the like. The second portions 151b and 152b may include the second material, e.g., an elastic material. The second portions 151b and 152b may be provided around edges of both sides of the first portions 151a and 152a, respectively.

According to an exemplary embodiment, the first portions 151a and 152a of the flange parts 151 and 152 may be made of at least one of a stainless steel, aluminum, and a plastic and the second portions 151b and 152b may be formed by a double injection process. For example, the second portions 151b and 152b may be formed on edges of two opposing sides of the first portions 151a and 152a, respectively, by performing a double injection process using an elastic member such as rubber or the like. The second portions 151b and 152b may extend along substantially an entire edge, e.g., an edge in a length direction that intersects the first direction, of the first portions 151a and 152b, respectively. The second portions 151b and 152b may extend along two opposing edges in the length direction, e.g., in the second direction, of the first portions 151a and 152a. Accordingly, the second portions 151b and 152b may be formed directly on the first portions 151a and 152a, respectively. The barriers 150 may have a predetermined strength and the flange parts 151 and 152 of the adjacent barriers 150 may be in contact with each other.

According to an exemplary embodiment, one of the battery cells 10 may be seated in both the first barrier 150 and the second barrier 150. The first barrier 150 may include first portions 151a and 152a and second portions 151b and 152b, and the second barrier 150 may include other first portions 151a and 152a and other second portions 151b and 152b. The first portions 151a and 152a of the first barrier 150 may overlap a portion of lateral sides of the battery cell 10, and the first portions 151a and 152a of the second barrier 150 may overlap other portions of the lateral sides of the battery cell 10. The second portions 151b and 152b on one end of the first portions 151a and 152b, respectively, of the first barrier 150 may contact the second portions 151b and 152b on one end of the first portions 151a and 152b, respectively, of the second barrier 150. Therefore, the second portions 151b and 152b of adjacent barriers 150 may be in contact with each other to form a sealing relationship therebetween.

The flange parts 151 and 152 of the barrier 150 may be made of the first material and at least a part of edges of the flange parts 151 and 152 made of the first material may be made of the second material. Further, the barrier 150 may be provided so that the flange parts 151 and 152 of adjacent barriers 150 contact each other, e.g., a center of a lateral side of a corresponding battery cell 10.

The flange parts 151 and 152 may include openings 151c and 152c, respectively. The openings 151c and 152c may be surrounded by the first portions 151a and 152a, respectively. Each of the flange parts 151 and 152 may include a plurality of the openings 151c and 152c, respectively. The openings 151c and 152c may be through-holes spaced apart from each other along the extending direction of the flange parts 151 and 152, respectively, e.g., in a longitudinal direction of the flange parts 151 and 152, respectively, and/or in the second direction. For example, the plurality of the openings 151c may be spaced apart along the flat plate portion, e.g., the tetragonal flat plate, of the flange part 151. Sizes and shapes of the openings 151c and 152c may be varied, e.g., the size the openings 151c and 152c may be varied with respect to the location of the opening. For example, the size of the openings 151c and 152c may be greater as a distance from an outer perimeter of the battery cell 10 and/or an outside of the battery module 100 is greater.

For example, the openings 151c may be separated by the first portions 151a of the flange part 151. The openings 151c may expose a portion of the base part 153 and may expose sides of both adjacent battery cells 10. However, embodiments are not limited thereto, e.g., separate openings 151c may expose the sides of adjacent battery cells 10. The plurality of openings 152c may be spaced apart along the flat plate portion of the flange part 152. For example, the openings 152c may be separated by the first portions 152a of the flange part 152. The openings 152c may expose a portion of the base part 153 and may expose sides of both adjacent battery cells 10. However, embodiments are not limited thereto, e.g., separate openings 152c may expose the sides of the adjacent battery cells 10.

According to an exemplary embodiment, a space may be provided between the battery cells 10 and the barriers 150. The space may act as one of passages U1 and U2 of, e.g., a heat exchange medium capable of controlling the heat generated in the battery cells 10. For example, the passages U1 and U2 may be defined by at least the flange parts 152 and 151, the base part 153, and the adjacent battery cells 10. Referring to FIG. 2A, the heat exchange medium may flow in through the openings 152c of the flange part 152 and flow out through the opening 151c of the flange part 151. However, embodiments are not limited thereto. The heat exchange medium may exchange heat, e.g., heat generated by the battery cells 10, by directly facing the widest surfaces of the battery cells 10. Accordingly, the temperature of the battery cell may be controlled, e.g., efficiently controlled, and the lifespan of the battery module 100 may be lengthened.

A plurality of passages U1 and U2 may be defined by at least the plurality of projections 154 on the base part 153 and the plurality of openings 152c and 151c. For example, each passage U1 may include a heat exchange medium entrance that is defined by one of the openings 152c. Thereafter, a flow path to a corresponding passage U2 at the opposing side of the base part 153 may be defined by ones of the plurality of projections 154. For example, the flow path may be defined by ones of the plurality of projections 154 arranged along substantially parallel lines so that the flow path is defined by the substantially parallel lines of the plurality of the plurality of projections 154. However embodiments are not limited thereto, e.g., the plurality of projections may have a staggered arrangement. Each passage U2 may include a heat exchange medium exit that is defined by one of the openings 151c. The battery module 100 may include a plurality of passages U1 that each correspond to at least one passage U2 so that a heat exchange entrance and a heat exchange exit may be defined between the passage U1 and the at least one corresponding passage U2.

The passage U1 and passage U2 may also be defined by the second portions 151b and 152b of the barriers 150. For example, the second portions 151b and 152b of adjacent barriers 150 may sealingly engage each other to define the flow paths for heat exchange medium. The second portions 151n and 152b of ones of the barriers 150 may include sealing edges that contact corresponding sealing edges on adjacent barriers 150. The sealing edges may be composed entirely of the second material, e.g., an elastic material forming an elastic member. The barriers 150 adjacent to the end plates 110 and 120 may include one sealing edge that contacts one of the end plates 110 and 120 and another sealing edge that contacts a sealing edge of an adjacent barrier 150.

Heat may be generated by repetitive charge and discharge in the battery cell. The heat may accelerate the deterioration of the battery cell 10. The heat may potentially cause serious problems such as ignition or explosion of the battery cell 10. Barriers, e.g., the barriers 150, may provide the movement passages for the heat exchange medium between battery cells 10 in the battery module 100. The barriers may separate the battery cells. The barriers may improve the fastening property of the battery module by fixing, e.g., fixing a location of, the plurality of battery cells 10 in the battery module 100. According to an exemplary embodiment, the barrier may have a predetermined strength and may be made of at least one of a hard stainless steel, aluminum, and a plastic. However, embodiments are not limited thereto, e.g., the materials that form the barriers 150 may be limited by characteristics of material itself, tolerance in assembly of the battery module, and/or the like. Due to, e.g., limited characteristics of materials, tolerances in assembly and/or the like, the flange parts 151 and 152 of the adjacent barriers 150 may be spaced apart from each other in the battery module 100.

The barriers 150 according to the exemplary embodiment may be provided so that the flange parts 151 and 152 of the adjacent barriers 150 are in close contact with each other. The first portions 151a and 152a of the flange parts 151 and 152 may be made of at least one of a stainless steel, aluminum, and a plastic. The second portions 151b and 152b as edges of the both sides of the first portions 151a and 152a may be formed by a double injection process by using an elastic member such as a rubber or the like. Accordingly, the barriers 150 may have a predetermined strength and the flange parts 151 and 152 of the adjacent barriers 150 may be in contact with each other.

According to an exemplary embodiment, the second portions 151b and 152b of the flange parts 151 and 152 may be in contact with each other, e.g., the second portions 151b and 152b may each include sealing edges that sealing contacts adjacent sealing edges. Thus, the flange parts 151 and 152 of the adjacent barriers 150 may be close to each other at the sides of the adjacent battery cells 10. The heat exchange medium may flow in and/or out efficiently through the openings 151c and 152c.

Hereinafter, another exemplary embodiment will be described with reference to FIGS. 3 to 5. The other exemplary embodiment is similar to the contents and characteristics disclosed in the exemplary embodiment described in FIGS. 1 to 2B, except for contents described below.

Figure 4A:
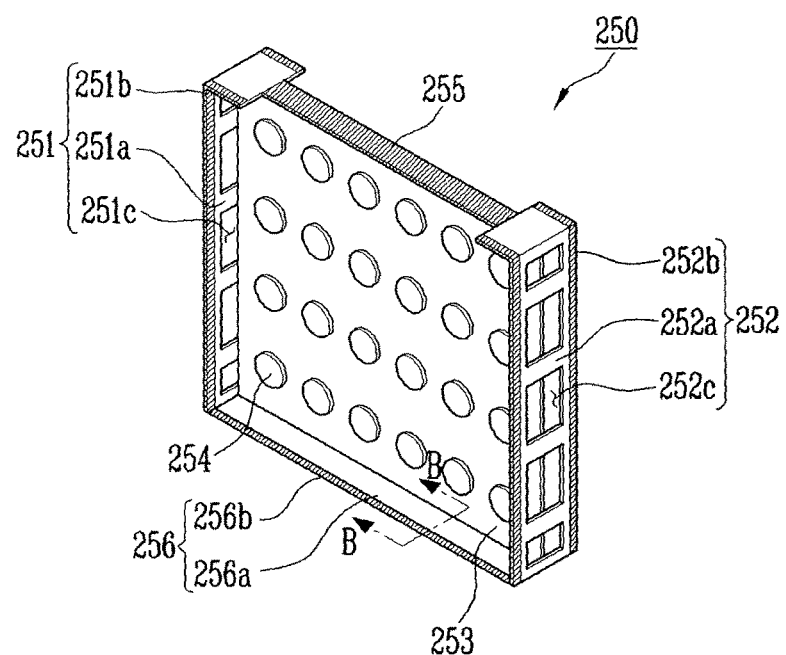
FIG. 4A illustrates a perspective view of a barrier, according to an exemplary embodiment.
Figure 4B:
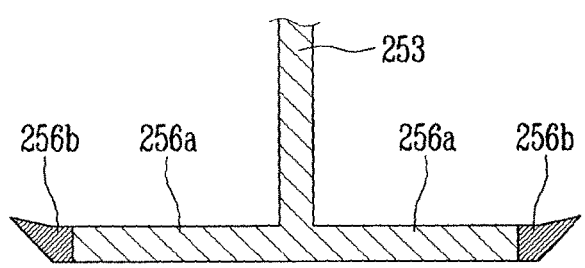
FIG. 4B illustrates a cross sectional view taken along line B-B of FIG. 4A.

FIG. 3 illustrates a perspective view of a battery module including a plurality of battery cells, according to an exemplary embodiment. FIG. 4A illustrates a perspective view of a barrier, according to an exemplary embodiment. FIG. 4B illustrates a cross sectional view taken along line B-B of FIG. 4A. FIG. 5 illustrates a cross sectional view taken along line A-A of FIG. 3.

Referring to FIGS. 3 to 4B, a battery module 200 may include a plurality of battery cells 10 arranged in the first direction. Barriers 250 may be interposed between battery cells 10. Housings 210, 220, 230, and 240 may accommodate the battery cells 10 and the barriers 250. Housings 210 and 220 may correspond to end plates. Housings 230 and 240 may correspond to connection members. The barrier 250 may include a base part 253, e.g., disposed in parallel to the battery cells 10. The base part 253 may include a plurality of projections 254, e.g., facing the widest surfaces of adjacent battery cells 10. The base part 253 may include flange parts 251, 252, and 256, e.g., extending therefrom. Each of the flange parts 251, 252, and 256 may at least extend along substantially an entire edge of the base part 253. The flange parts 251, 252, and 256 may contact the battery cell 10 in at least any one of upper portions, lower portions, and sides.

The barrier 250 may be made of at least one of a metal, a stainless steel, aluminum, and a plastic. The flange parts 251, 252, and 256 may include an elastic member thereon, e.g., the elastic member may include a rubber or the like. The flange parts 251, 252, and 256 may include first and second flange portions provided at the sides of the base part 253. For example, the flange part 251 may include a first flange portion 251a and a second flange portion 251b. The flange part 252 may include a first flange portion 252a and a second flange portion 252b. The flange part 256 may include a first flange portion 256a and second flange portion 256b. The first flange portions 251a, 252a, and 256a may include the first material and the second flange portions 251b, 252b, and 256b may include the second material that is different from the first material.

The flange parts 251 and 252 may be disposed at least on opposing sides of the base part 253. The flange part 256 may be disposed between the flange parts 251 and 252, e.g., the flange part 256 may connect the flange parts 251 and 252 along another side of the base part 253. The flange part 256 may be a lower flange part 256. The flange parts 251 and 252 may include openings 251c and 252c. The flange part 256 may exclude openings. An upper part 255 may be disposed on a side of the base part 253 opposite the side including the lower flange part 256. The upper part 255 may connect the flange parts 251 and 252 along another side of the base part 253.

The upper part 255 may connect the flange parts 251 and 252 and may be in contact with upper sides of the battery cells 10. The upper part 255 may contact the cap assembly 14 of the adjacent battery cells 10. The cap assembly 14 of the battery cell 10, may include the positive and negative terminals 11 and 12 and the vent 14, which may be exposed to the outside of the battery cell 10.

In the battery module 200, the upper part 255 may not be influenced on the load of the battery cell due to, e.g., a structural characteristic thereof. Accordingly, an additional member, e.g., for supporting the upper side, may not be required at the upper side of the battery cell 10. For example, the upper part 255 may be made of an elastic member such as rubber or the like. The upper part 255 may be made of only the elastic member. The upper part 255 may be directly coupled with extensions of the flange parts 251 and 252 on the upper sides of the adjacent battery cells 10, e.g., as illustrated in FIG. 4A. The upper part 255 may be in close contact with the cap assembly 14 of the battery cell 10. The upper part 255 may reduce the possibility of and/or prevent a leakage of the heat exchange medium at the upper side of the battery module 200.

The lower flange part 256 may connect the flange parts 251 and 252 at bottom sides of the adjacent battery cells 10, e.g., at sides of the battery cells 10 opposing the upper sides. According to an exemplary embodiment, the first flange portions 251a, 252a, and 256a may be made of at least any one of a hard stainless steel, aluminum, a plastic. The second flange portions 251b, 252b, and 256b, e.g., as edges of both sides of the first flange portions 251, 252a, and 256a, respectively, may be made of an elastic member such as a rubber or the like. The lower flange part 256 may extend by the same width as the flange parts 251 and 252. Since the lower flange part 256 may extend by the same width, the second flange portions 251b, 252b, and 256b may be continuously formed across the sides of the flange parts 251, 252, and 256 by the doubly injecting elastic material thereon. As described above, the lower flange part 256 may overlap sides of the two adjacent battery cells 10. In the lower flange part 256, the second portions 256b of adjacent cell barriers 250 may contact each other, e.g., in a sealing relationship. Openings may not be included in the lower flange part 256. The lower flange part 256 may reduce the possibility of and/or prevent a leakage of the heat exchange medium at the lower side of the battery module 200.

Referring to FIGS. 4A and 4B, the edges of the flange parts 251, 252, and 256 may have a triangular pyramid shape of cross-section, e.g., that is gradually tapered toward an edge. For example, when the flange parts 251, 252, and 256 include second portions 251a, 252b, and 256b, the second portions 251a, 252b, and 256b may have the triangular pyramid shape of cross-section. The second portions 251a, 252b, and 256b, which may be at both ends of the barrier 250, may be formed inclined toward the sides of the adjacent battery cells 10. The edges of the second portions 251b, 252b, and 256b may be gradually tapered toward the edge, and the gradually tapered section may be inclined toward the sides of the adjacent battery cells 10.

The lower flange part 256 may be connected with base part 253, e.g., in the center the first portion 256a to support the bottom of the battery cell 10. The second portion 256b may be made of an elastic member and may have a triangular pyramid shape of cross-section. Accordingly, the end of the second portion 256b may be inclined toward the bottom of the battery cell 10. Thus, the second portion 256b may be close to the bottom of the battery cell 10. As described above, the shape of the second portion 256b is not limited to the lower flange part 256 and may be applied to the first and second side flange parts 251 and 252 and/or the upper flange part 255.

Heat exchange efficiency between the battery cells 10 may be improved, e.g., due to the elastic member provided in at least the flange parts 251, 252, and 256 of the barriers 250 and/or the shape of the edges of the flange parts flange parts 251, 252, and 256. Thereby, a use lifespan of the battery module 200 may be extended and/or a cost of the battery module 200 may be reduced.

Figure 5:
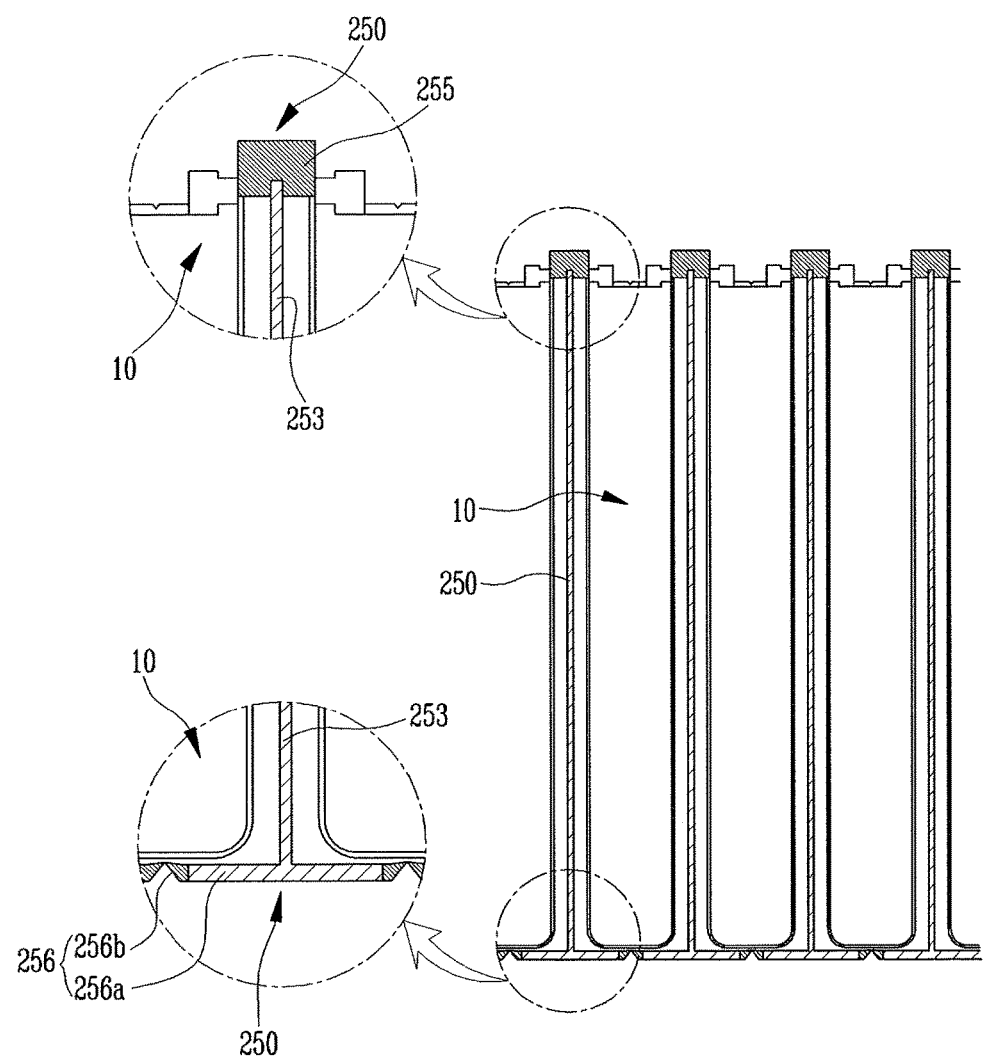
FIG. 5 illustrates a cross sectional view taken along line A-A of FIG. 3.

Referring to FIG. 5, in the battery module 200 including the barriers 250 according to the exemplary embodiment, the upper part 255 may be made of an elastic member and may be in close contact with the upper side of the battery cell 10. The lower flange part 256 may be provided at the lower side of the battery cell and the lower flange part 256 may be close to, e.g., in close contact with, the bottom of the battery cell 10. Due to, e.g., the arrangement of the upper part 255 and the lower flange part 256, the heat exchange medium may flow into and/or out from the battery module 200 through the openings 251a and 252b of the flange parts 251 and 252. Therefore, unnecessary waste of the heat exchange medium used for cooling and heating the battery cell 10 may be reduced and heat exchange efficiency of the battery cell 10 may be improved.

By way of summation and review, at the inside of a battery cell, an electrochemical reaction may occur. As a result of the electrochemical reaction, gas may be generated by, e.g., a side reaction, in and around the battery cell. The gas may change an appearance of the battery cell. Heat may be generated by repetitive charge and discharge in the battery cell. The heat may accelerate the deterioration of the battery cell and/or may cause problems such as ignition or explosion of the battery cell. Accordingly, an overall shape of the battery module formed by arranging the plurality of battery cells may be influenced by, e.g., the heat generation, which may reduce the possibility of and/or prevent the battery cells from being stably fixed within the battery module.

In contrast, embodiments, e.g., the exemplary embodiments discussed above, may relate to a battery module including a cell barrier with improved heat exchange efficiency. Embodiments may relate to a battery module capable of minimizing and/or preventing a change in the position of individual battery cells in the battery module due to, e.g., an external force, by stably fixing the battery cell. According to exemplary embodiments, a battery module may have improved heat exchange efficiency, thereby improving the lifespan thereof. Further, according to exemplary embodiments, a battery module may have improved fixability of each battery cell, thereby improving stability of the battery module.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A battery module, comprising:
   a plurality of battery cells; and
   a plurality of cell barriers, each cell barrier being between adjacent battery cells of the plurality of battery cells and including at least one flange, the flange having a first flange portion and a second flange portion,
   the first flange portion having a first sealing edge extending therefrom and overlapping a first lateral side of one of the adjacent battery cells, and
   the second flange portion having a second sealing edge extending therefrom and overlapping a second lateral side of another of the adjacent battery cells, wherein:
   the first and second sealing edges have a tapered shape such that a thickness of each of the first and second sealing edges continuously decreases, and
   ends of the tapered first and second sealing edges are tapered toward sides of the adjacent battery cells.

2. The battery module of claim 1, wherein the first sealing edge and the second sealing edge of adjoining cell barriers sealingly define flow passageways between the adjacent battery cells.

3. The battery module of claim 1, wherein the first sealing edge sealingly contacts the second sealing edge.

4. The battery module as claimed in claim 1, wherein the first sealing edge and second sealing edge include an elastic member.

5. The battery module as claimed in claim 1, wherein:
   the one flange overlaps first and second lateral sides of the adjacent battery cells, and
   each cell barrier includes another flange overlapping third lateral sides of the adjacent battery cells, the first lateral sides and the second lateral sides opposing the third lateral sides, respectively.

6. The battery module as claimed in claim 5, wherein the one flange and the other flange include flow openings for flow of heat exchange medium therethrough.

7. The battery module as claimed in claim 5, wherein each cell barrier includes:
   a lower flange overlapping fourth lateral sides of the adjacent battery cells, and
   an upper part adjacent to fifth lateral sides of the adjacent battery cells, the fourth lateral sides opposing the fifth lateral sides.

8. The battery module as claimed in claim 7, wherein the upper part is an elastic member that connects the one flange and the other flange.

9. The battery module as claimed in claim 1, wherein the cell barriers define passageways along the battery cells for flow of heat exchange medium between flow openings in each flange.

10. A battery module, comprising:
    a plurality of battery cells; and
    a plurality of cell barriers, each cell barrier being between adjacent battery cells of the plurality of battery cells and including at least one flange, the flange having a first flange portion and a second flange portion that is symmetrically aligned with the first flange portion,
    the first flange portion having a first sealing edge extending therefrom and overlapping a first lateral side of one of the adjacent battery cells, and the second flange portion having a second sealing edge extending therefrom and overlapping a second lateral side of another of the adjacent battery cells, wherein:

the first sealing edge and second sealing edge include an elastic member, the elastic member of the first sealing edge and the elastic member of the second sealing edge are formed of an elastic second material that is different from a hard first material that forms other portions of the plurality of cell barriers.

11. The battery module as claimed in claim 10, wherein:

the first material includes at least one of stainless steel, aluminum, and plastic, and the second material includes rubber.

* * * * *